(12) United States Patent
Marquez Llinas et al.

(10) Patent No.: US 11,371,222 B2
(45) Date of Patent: Jun. 28, 2022

(54) SYSTEM FOR FIXING AN ADAPTER FOR EARTH-MOVING MACHINES

(71) Applicant: Metalogenia Research & Technologies, S.L., Barcelona (ES)

(72) Inventors: Jordi Marquez Llinas, Barcelona (ES); Nil Vallvé, Barcelona (ES); Raúl Jaras Villar, Alava (ES); Jaime Fernández Hernández, Alava (ES); Jorge Triginer Boixeda, Barcelona (ES); Ester Alonso Frigola, Girona (ES)

( * ) Notice: Subject to any disclaimer, the term of this patent is extended or adjusted under 35 U.S.C. 154(b) by 25 days.

(21) Appl. No.: 17/257,393

(22) PCT Filed: Jul. 4, 2019

(86) PCT No.: PCT/EP2019/067935
§ 371 (c)(1),
(2) Date: Dec. 31, 2020

(87) PCT Pub. No.: WO2020/007958
PCT Pub. Date: Jan. 9, 2020

(65) Prior Publication Data
US 2021/0270017 A1    Sep. 2, 2021

(30) Foreign Application Priority Data
Jul. 5, 2018  (EP) .................................. 18382496

(51) Int. Cl.
*E02F 9/28* (2006.01)
*E02F 9/26* (2006.01)
*G01D 5/14* (2006.01)

(52) U.S. Cl.
CPC .............. *E02F 9/2825* (2013.01); *E02F 9/26* (2013.01); *E02F 9/2833* (2013.01); *G01D 5/14* (2013.01)

(58) Field of Classification Search
CPC .......... E02F 9/26; E02F 9/2825; E02F 9/2833
See application file for complete search history.

(56) References Cited

U.S. PATENT DOCUMENTS

| 5,465,512 A | 11/1995 | Livesay et al. | |
| 5,743,031 A * | 4/1998 | Launder | E02F 9/267 37/906 |
| 6,870,485 B2 * | 3/2005 | Lujan | E21C 35/04 340/480 |

(Continued)

FOREIGN PATENT DOCUMENTS

| EP | 2913441 A1 | 9/2015 |
| EP | 3327205 A1 | 5/2018 |

*Primary Examiner* — Gary S Hartmann
(74) *Attorney, Agent, or Firm* — Quan & Associates; Christopher Quan

(57) ABSTRACT

A system for fixing an adapter for earth-moving machines, which comprises: a fixing element (1) that fixes an adapter (2) to an edge (10) of a shovel of the earth-moving machine; and a wedge (3) placed in contact between the fixing element (1) and the edge (10), characterized in that the system comprises a plurality of sensors (4) arranged on the wedge (3) or on the fixing element (1) that detect at least one detection element (5) arranged in the other of the fixing element (1) or the wedge (3). It makes it possible continuously to detect and to monitor the position of the wedge relative to the fixing element without the need to check the position of the wedge visually.

9 Claims, 3 Drawing Sheets

(56) References Cited

U.S. PATENT DOCUMENTS

| | | | |
|---|---|---|---|
| 8,820,845 B2* | 9/2014 | Hall | E21C 35/183 |
| | | | 299/1.05 |
| 9,243,381 B2* | 1/2016 | Behmlander | E02F 3/8152 |
| 9,670,649 B2* | 6/2017 | Bewley | E02F 9/267 |
| 10,011,975 B2 | 7/2018 | Carpenter et al. | |
| 10,669,698 B2* | 6/2020 | Carpenter | E02F 9/2825 |
| 10,677,699 B2* | 6/2020 | Marquez Llinas | E02F 9/267 |
| 2004/0227645 A1* | 11/2004 | Lujan | E21F 17/18 |
| | | | 340/870.07 |

* cited by examiner

SYSTEM FOR FIXING AN ADAPTER FOR EARTH-MOVING MACHINES

CROSS-REFERENCE TO RELATED APPLICATIONS

This application is a 371-national stage application of Patent Cooperation Treaty international application Ser. No. PCT/EP2019/067935, filed Jul. 4, 2019, entitled "SYSTEM FOR FIXING AN ADAPTER FOR EARTH-MOVING MACHINES", which claims the benefit and priority of European Patent Application Ser. No. EP18382496, filed Jul. 5, 2018, entitled "FASTENING SYSTEM OF AN ADAPTER FOR EARTHMOVING MACHINES", the contents of all of which is are hereby incorporated by reference in its their entireties.

The present invention relates to a system for fixing an adapter for earth-moving machines that makes it possible to monitor the correct positioning thereof continuously and in an automated manner.

BACKGROUND OF THE INVENTION

It is customary to use earth-moving machines such as, for example, excavators or loaders and electric shovels for tasks in the field of public works, mining, etc. In general, these machines comprise a shovel provided with a plurality of edges into which the material is gathered. This shovel is subject to high forces and to a high rate of wear, principally in the front zone, customarily called the blade. For this reason, in general, blades usually incorporate a plurality of protection or wear elements.

These protection elements include:
teeth: these have the function of penetrating the earth, assisting in loading material and protecting the shovel blade;
adapter: this has the function of protecting the blade and supporting the teeth;
front protectors: these have the function of protecting the lip in the zones between the teeth and also fulfil the function of penetration, albeit to a lesser extent than the teeth;
lateral protectors: these protect the sides of the shovel.

All these elements, usually called, overall, wear or protection elements, are subject to high levels of mechanical stresses, plastic deformations and a high level of wear. For this reason, it is customary for them to have to be replaced with a degree of frequency, when the wear suffered so requires.

The wear or protection elements may be fixed mechanically or be welded, depending on the level of abrasiveness of the earth and the dimensions of the machine. If they are fixed mechanically, they can be changed easily and rapidly, whereas if they are welded they are cheaper but are more difficult to change and pose a risk of damage to the blade with the welding.

Mechanical fixing of the adapters is usually achieved by means of a fixing element with a C cross section, which is fixed to each edge of the shovel, and a wedge press-fitted between said fixing element and the adapter.

During its use, said wedge tends to move and to shift downward, and said shifting must be monitored in order to ensure the correct functioning of the wear elements, ensuring that the wedge is in a correct position.

During work, the front of the blade is worn and deforms plastically with friction with the adapter. Another point where wear/deformation appears is between the wedge and the front part of the blade hole.

With said wear and plastic deformations, the adapter or protector shifts backward, thereby increasing the space in order that the wedge and the front part of the blade hole. When said space appears, the wedge drops until it is again under tension. It is very important for the adapter and protector to work under tension in order to avoid the latter falling or breaking during operation.

It is important to avoid the shifting of the wedge being so great that it emerges underneath the adapter or protector since, if it emerges underneath and strikes the ground it may emerge and be thrown upward, this being very dangerous for users and it will furthermore give rise to the falling of the tooth holder (unplanned shutdown, production loss, etc.); it is therefore very important to be aware of the wedge position.

There is currently no reliable way in which to check the position of the wedge. Visual inspection via the upper part of the tooth holder or protectors offers no guarantee, since the wear suffered by the shovels of the tooth holders or protectors and the actual wedge make it impossible to determine the actual height thereof. Another option would be to check the position of the wedge via the lower part, which is less exposed to wear. However, it is extremely dangerous to place oneself underneath the scoop and to check it visually. It is an operation banned by mining companies in order to prevent accidents.

When it has been detected that the wedge has dropped considerably, it is assumed that the wear and/or plastic deformation at the front of the blade and the front of the hole is at the limit of its service life and has to be reconstructed to the original geometry in order to ensure correct support and mounting between the wear elements and blade. This reconstruction is necessary in order to prevent play between the elements and the elements ultimately breaking during the excavation operation. In certain applications, before proceeding to reconstruct the front of the blade, an intermediate step is to change the wedge for another, thicker wedge, in order to restore tension in the mechanical system. When this second wedge has again shifted considerably downward, the sole option then is to reconstruct the front of the blade. Currently, there is no marker enabling the user to ascertain the most suitable moment at which to change the wedge or to proceed with reconstruction of the lip.

Currently, this monitoring of the wedge position is performed visually by specialist personnel, which involves a significant time investment, since it has to be carried out periodically for each of the adapters or protectors of each earth-moving machine. A further factor is safety, since the operator might decide to place himself under the scoop in order to check the position of the wedges. Furthermore, it is necessary for the machine to be completely shut down in order to carry out this inspection. In addition, it has to be performed with operators in attendance, requiring personnel from the mine or work site to travel to the machine in question in order to proceed with the check. Moreover, owing to the greater and lesser wear suffered by adapters and protectors, it is not possible to take a precise measurement of the shifting of the wedge.

Therefore, an object of the present invention is to provide a fixing system for an adapter and protector that makes it possible continuously or substantially continuously to monitor the position of the wedges in an automated, safe and remote manner without the need to shut down the machine or for personnel to travel to the mine stope or work site.

DESCRIPTION OF THE INVENTION

The aforementioned drawbacks are successfully resolved with the fixing system of the invention, which offers further advantages that will be described below.

The system for fixing an adapter for earth-moving machines according to the present invention comprises:

a fixing element that fixes an adapter to an edge of a shovel of the earth-moving machine; and a wedge placed in contact between the fixing element and the edge, inside the orifice of the adapter, and is characterized in that the system comprises a plurality of sensors arranged on the wedge or on the fixing element that detect at least one detection element arranged in the other of the fixing element or the wedge. That is to say, said sensors are mounted on the wedge and said at least one detection element is mounted on the fixing element, or vice versa.

By virtue of this feature, it is possible continuously to detect and to monitor the position of the wedge relative to the fixing element without the need to check the position of the wedge visually.

According to two alternative embodiments, said sensors are magnetic field sensors or said sensors are metal sensors.

According to said alternative embodiments, said at least one detection element is a magnet or a plurality of magnets or said at least one detection element is an orifice or a plurality of orifices.

For example, said metal sensors may be spirals printed on a printed circuit board.

Advantageously, said sensors are connected to a control means that performs the calculations to determine the position of the wedge relative to the fixing element and sends the result of said calculations to an external element, in a wired or wireless manner, on which it is possible to view the information regarding the wedge position.

For example, said information may be viewed in a specific app on a cell phone, it being possible for alarms to be emitted in the event that it is determined that the wedge position is not a suitable position. This information may likewise be viewed on a control screen in the operator cab of the machine in order to advise said operator of possible incidents. For example, if the wedge has shifted more than is recommended, the operator receives an alert in order to proceed to changing the wedge before a fall or breakage of the wear element in question.

It must be indicated that, in the present description and in the claims, the term "adapter" is intended to identify a tooth holder, a protector, a lateral protector or any adapter that is mechanically fixed to an earth-moving machine.

BRIEF DESCRIPTION OF THE DRAWINGS

For the purposes of a better understanding of that which has been set forth, there are accompanying drawings which, schematically and solely by way of non-limiting example, show certain embodiments.

DESCRIPTION OF THE PREFERRED EMBODIMENTS

Figure 1:
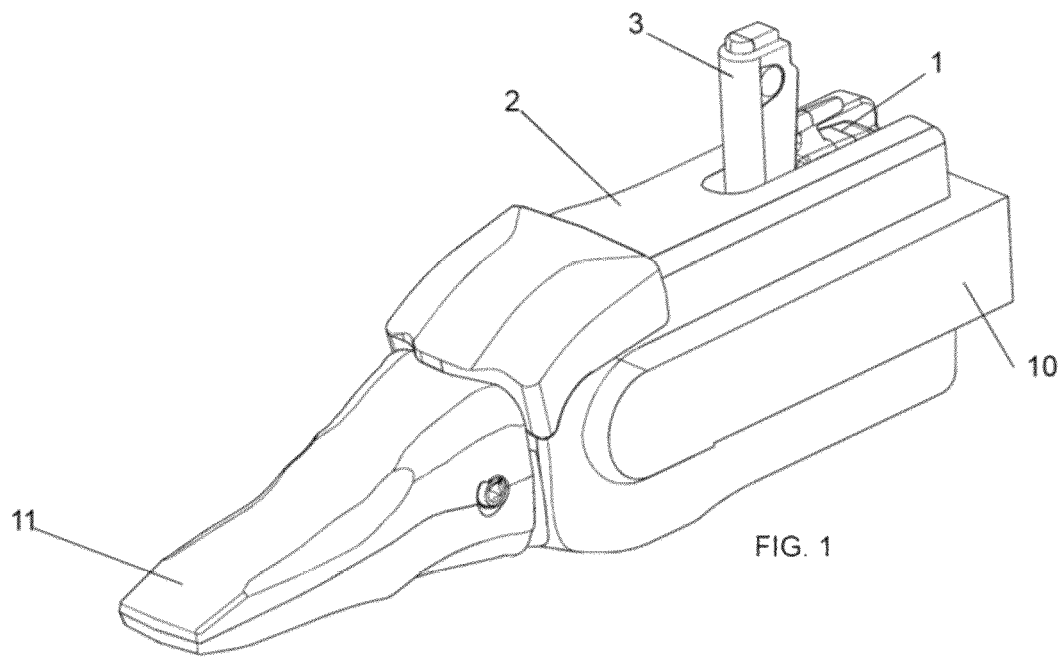
FIG. 1 is a perspective view of the fixing of a tooth and an adapter to an edge of a shovel of an earth-moving machine.
Figure 2:
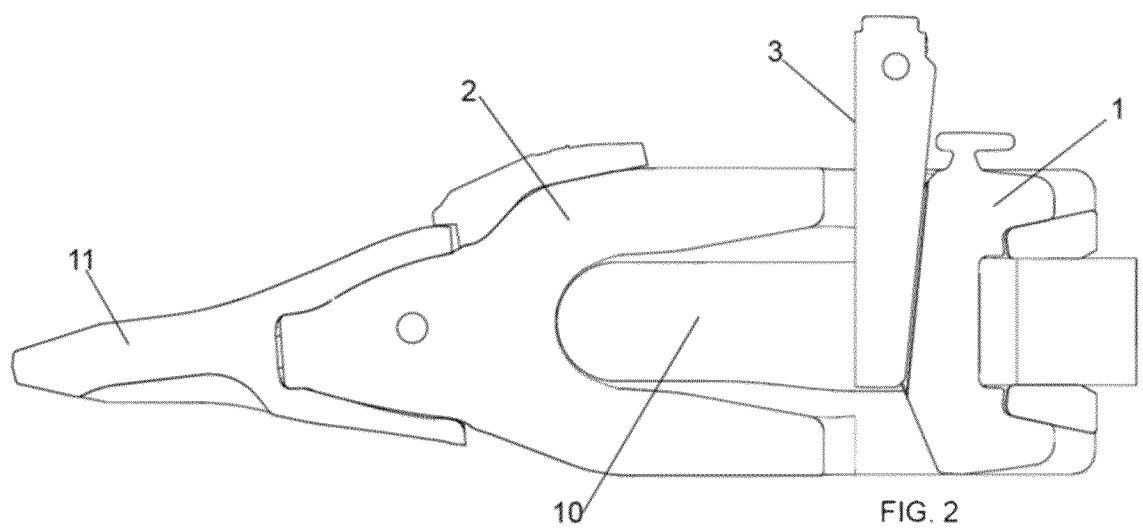
FIG. 2 is a view in longitudinal section of the fixing of the tooth and the adapter of FIG. 1.

FIGS. 1 and 2 show an edge 10 of a shovel of an earth-moving machine on which is fixed an adapter 2, a tooth 11 of an earth-moving machine being fixed to the front end thereof.

The adapter 2 is fixed to the edge 10 of the shovel by means of a fixing element 1 with a C cross section, as shown in FIG. 2, and a wedge 3 placed in contact between the fixing element 1 and the edge 10.

In order to detect the position of the wedge 3 relative to the fixing element 1, the fixing system comprises a plurality of sensors 4 that detect at least one detection element 5.

The data on detection of the position of the wedge 3 are sent to a control means 6 that may be placed in the actual fixing system, for example on the wedge 3 or on the fixing element 1, and this control means 6 may be connected to an external processor, by cable or wirelessly, for example, to a cell phone provided with a specific app, indicating the position and possible changing of the wedge 3 to the user.

Figure 3:
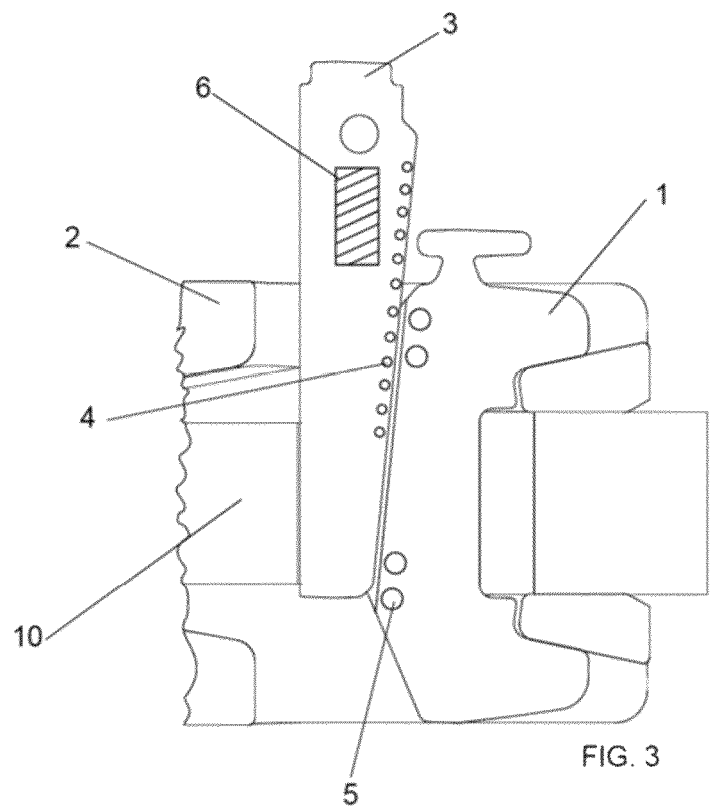
FIG. 3 is a view in cross section showing the fixing system of the present invention according to a first embodiment.
Figure 4:
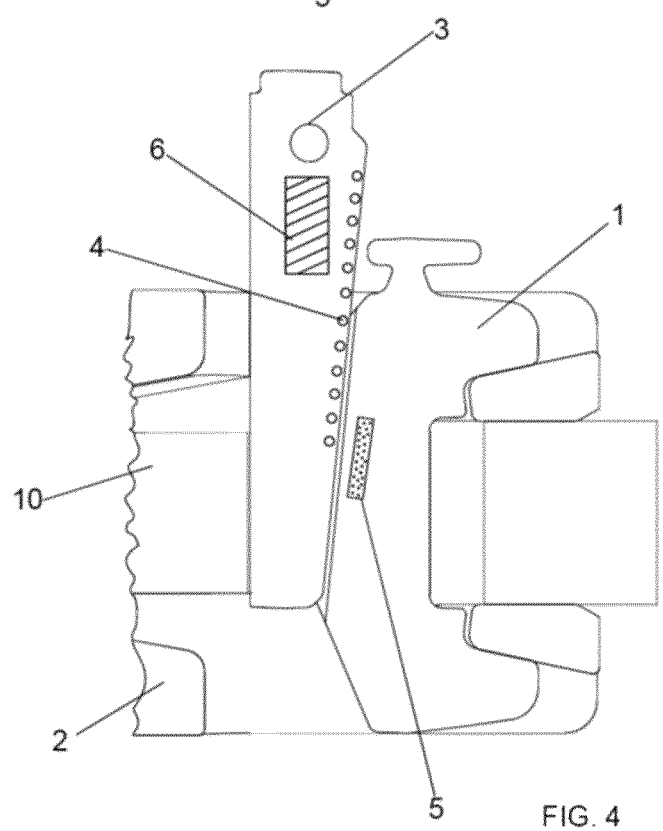
FIG. 4 is a view in cross section showing the fixing system of the present invention according to a second embodiment.
Figure 5:
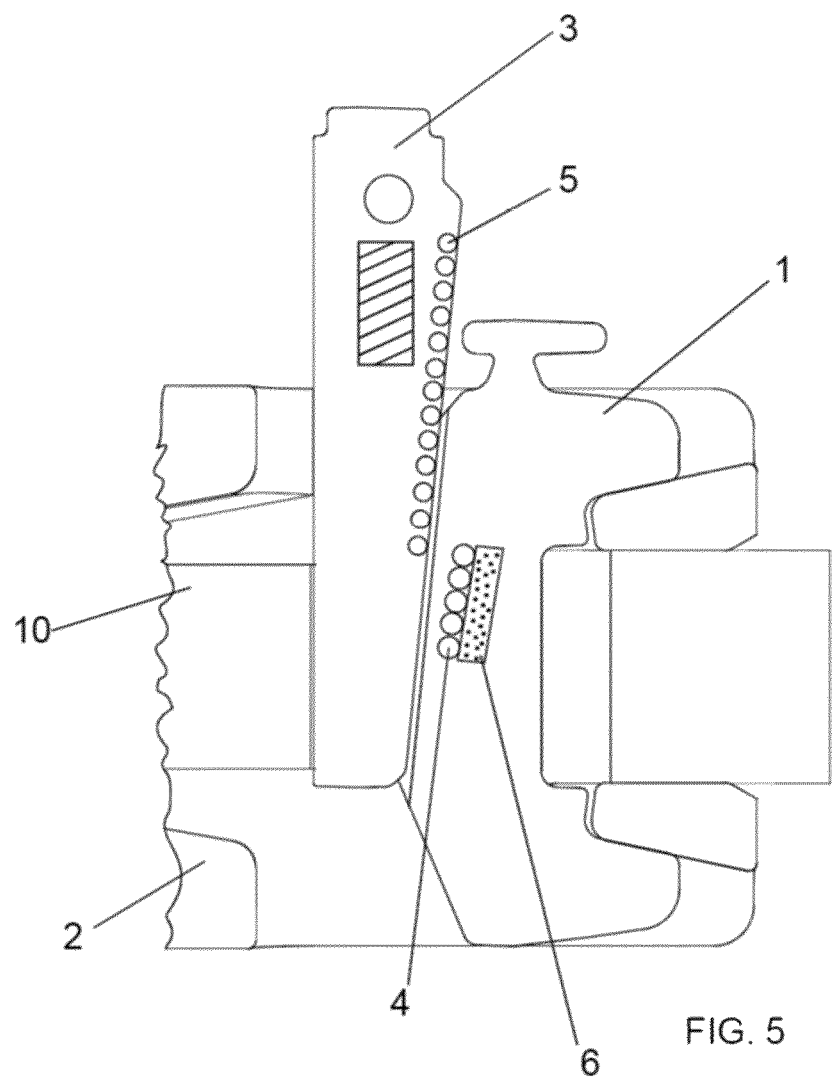
FIG. 5 is a view in cross section showing the fixing system of the present invention according to a third embodiment.

Three different embodiments of the fixing system according to the present invention are shown in FIGS. 3 to 5.

In the first embodiment shown in FIG. 3, the sensors 4 are placed on the wedge 3 vertically and are magnetic sensors, and the fixing element 1 comprises a plurality of magnets that are likewise placed vertically, these being the detection elements 5.

It should, however, be pointed out that the sensors 4 could be placed on the fixing element 1 and the detection elements 5 could be placed on the wedge, as the detection effect would be the same.

In the second embodiment shown in FIG. 4, the sensors 4 are likewise placed vertically on the wedge 3 and are metal detection sensors, for example, a plurality of spirals printed on a printed circuit board which is arranged vertically. For its part, the detection element 5 is an orifice made in the fixing element 1. Furthermore, in this embodiment, the control means 6 is placed on the wedge 3.

The third embodiment shown in FIG. 5 is very similar to the second embodiment. The principal difference is that the sensors 4 are arranged on the fixing element 1 while the wedge 3 comprises a plurality of orifices used as detection elements 5.

In this third embodiment, the sensors 4 are also metal detection sensors, and likewise a plurality of spirals printed on a printed circuit board. Furthermore, in this embodiment, the control means 6 is placed on the fixing element 1.

The fixing system according to the present invention functions as follows:

The adapter 2 is fixed onto the edge 10 of the shovel of the earth-moving machine in a conventional manner by means of the fixing element 1 and the wedge 3 which have been described previously.

Unlike conventional fixing systems, in which it is not possible automatically and continuously to determine the position of the wedge 3 relative to the fixing element 1, in the fixing system of the present invention the detection elements 5 continuously and precisely determine the position of the wedge 3 relative to the fixing element 1.

In the first embodiment, the relative position of the magnetic sensors 4 relative to the magnets 5 is detected. The signal relating to this position is sent to the control means 6, which performs the necessary calculations to provide a user with information as to the position of the wedge 3.

The user is able to view said information by means of an external device, for example a computer, a cell phone or any other suitable device. Furthermore, if required, the control means 6 can emit an alert signal in the event that the position of the wedge 3 is determined to be unsuitable as a function of predetermined parameters.

For example, on the external device there may be an indication in different colors. Thus, green could indicate that the position of the wedge is correct, orange could indicate that intervention will be required in the near future, and red could indicate that the functioning of the machine must be had in order to change the wedge or to reconstruct the blade.

In the second and third embodiments, functioning is the same. In this case, the position of the orifice or orifices is determined by means of the sensors 4, the necessary calculations likewise being performed by means of the control means 6 in order to determine the specific position of the wedge 3.

Despite the fact that reference has been made to a concrete embodiment of the invention, it is obvious for a person skilled in the art that the fixing system described is able to encompass numerous variations and modifications and that all the details mentioned may be replaced by other, technically equivalent details without departing from the scope of protection defined by the attached claims.

The invention claimed is:

1. A system for fixing an adapter for earth-moving machines, which comprises:
   a fixing element that fixes an adapter to an edge of a shovel of the earth-moving machine; and
   a wedge placed in contact between the fixing element and the edge, characterized in that the system comprises a plurality of sensors arranged on the wedge or on the fixing element that detect at least one detection element arranged in the other of the fixing element or the wedge.

2. The system for fixing an adapter for earth-moving machines as claimed in claim 1, wherein said sensors are magnetic field sensors.

3. The system for fixing an adapter for earth-moving machines as claimed in claim 1, wherein said sensors are metal sensors.

4. The system for fixing an adapter for earth-moving machines as claimed in claim 1, wherein said at least one detection element is a magnet or a plurality of magnets.

5. The system for fixing an adapter for earth-moving machines as claimed in claim 1, wherein said at least one detection element is an orifice or a plurality of orifices.

6. The system for fixing an adapter for earth-moving machines as claimed in claim 3, wherein said metal sensors are spirals printed on a printed circuit board.

7. The system for fixing an adapter for earth-moving machines as claimed in claim 1, wherein said sensors are connected to a control means that performs the calculations for determining the position of the wedge relative to the fixing element.

8. The system for fixing an adapter for earth-moving machines as claimed in claim 2, wherein said at least one detection element is a magnet or a plurality of magnets.

9. The system for fixing an adapter for earth-moving machines as claimed in claim 3, wherein said at least one detection element is an orifice or a plurality of orifices.

* * * * *